United States Patent
Menke et al.

(10) Patent No.: US 9,408,347 B2
(45) Date of Patent: Aug. 9, 2016

(54) AGRICULTURAL HARVESTER

(71) Applicant: Maschinenfabrik Bernard Krone GmbH, Spelle (DE)

(72) Inventors: Stefan Menke, Spelle (DE); Bernd Schniederbruns, Wietmarschen (DE); Lars Ambrosy, Bremen (DE); Rainer Hory, Bremen (DE)

(73) Assignee: Maschinenfabrik Bernard Krone GmbH, Spelle (DE)

(*) Notice: Subject to any disclaimer, the term of this patent is extended or adjusted under 35 U.S.C. 154(b) by 0 days.

(21) Appl. No.: 14/535,469

(22) Filed: Nov. 7, 2014

(65) Prior Publication Data

US 2015/0149048 A1    May 28, 2015

(30) Foreign Application Priority Data

Nov. 8, 2013 (DE) .................. 10 2013 018 724

(51) Int. Cl.

| | |
|---|---|
| *G02B 26/00* | (2006.01) |
| *A01D 43/073* | (2006.01) |
| *A01D 43/08* | (2006.01) |
| *G01J 1/02* | (2006.01) |
| *G01J 1/04* | (2006.01) |
| *G02B 26/10* | (2006.01) |

(52) U.S. Cl.
CPC ............ *A01D 43/073* (2013.01); *A01D 43/087* (2013.01); *G01J 1/0242* (2013.01); *G01J 1/0403* (2013.01); *G02B 26/101* (2013.01)

(58) Field of Classification Search
CPC .... G01J 1/0242; G01J 1/0403; A01D 43/087; A01D 43/073; G02B 26/101
See application file for complete search history.

(56) References Cited

U.S. PATENT DOCUMENTS

| | | | | |
|---|---|---|---|---|
| 5,575,316 | A * | 11/1996 | Pollklas | A01D 43/073 141/198 |
| 7,504,988 | B2 * | 3/2009 | Tsuchihashi | G01S 13/34 342/158 |
| 8,234,047 | B2 * | 7/2012 | Madsen | A01D 43/073 56/10.2 R |
| 8,451,139 | B2 * | 5/2013 | Morselli | A01D 43/086 340/901 |
| 8,499,537 | B2 * | 8/2013 | Correns | A01D 43/087 141/231 |
| 8,682,540 | B2 * | 3/2014 | Missotten | A01D 41/1217 701/50 |
| 9,119,342 | B2 * | 9/2015 | Bonefas | A01D 34/001 |
| 2002/0021229 | A1 * | 2/2002 | Stein | B60K 31/0008 340/933 |
| 2003/0174207 | A1 * | 9/2003 | Alexia | A01D 43/073 348/89 |
| 2006/0109536 | A1 | 5/2006 | Mettenleiter et al. | |
| 2007/0219720 | A1 * | 9/2007 | Trepagnier | B60W 30/00 701/300 |
| 2009/0044505 | A1 * | 2/2009 | Huster | A01D 43/087 56/10.2 R |
| 2009/0096994 | A1 * | 4/2009 | Smits | G02B 26/101 353/30 |

(Continued)

FOREIGN PATENT DOCUMENTS

DE    44 26 059 A1    2/1996
EP    2 306 219 A2    4/2011

*Primary Examiner* — Truc M Do
(74) *Attorney, Agent, or Firm* — Gudrun E. Huckett

(57) ABSTRACT

An agricultural harvester is provided with a pivotable discharge elbow that conveys picked-up and processed crop into a transport container of a transport vehicle. An electro-optical device is correlated with the discharge elbow. An electronic evaluation and control processing unit is connected to the electro-optical device and processes signals received from the electro-optical device to effect an automatic targeted control of the crop stream into the transport container based on the processed signals. The electro-optical device is a 3D laser scanner provided with a 2D laser scanner and a pivot unit that pivots the 2D laser scanner about an approximately horizontal axis.

5 Claims, 1 Drawing Sheet

(56) References Cited

U.S. PATENT DOCUMENTS

| | | | |
|---|---|---|---|
| 2011/0061762 A1* | 3/2011 | Madsen | A01D 43/087 141/1 |
| 2011/0066337 A1* | 3/2011 | Kormann | A01D 43/073 701/50 |
| 2012/0029732 A1* | 2/2012 | Meyer | A01B 69/008 701/2 |
| 2012/0087771 A1* | 4/2012 | Wenzel | A01F 12/60 414/808 |
| 2012/0215409 A1* | 8/2012 | Wang | A01D 41/1278 701/50 |
| 2013/0205733 A1* | 8/2013 | Peters | A01D 41/127 56/10.1 |
| 2013/0211658 A1* | 8/2013 | Bonefas | B65G 67/24 701/28 |
| 2013/0211675 A1* | 8/2013 | Bonefas | B62D 12/02 701/41 |
| 2014/0325422 A1* | 10/2014 | Madsen | A01D 43/087 715/771 |

* cited by examiner

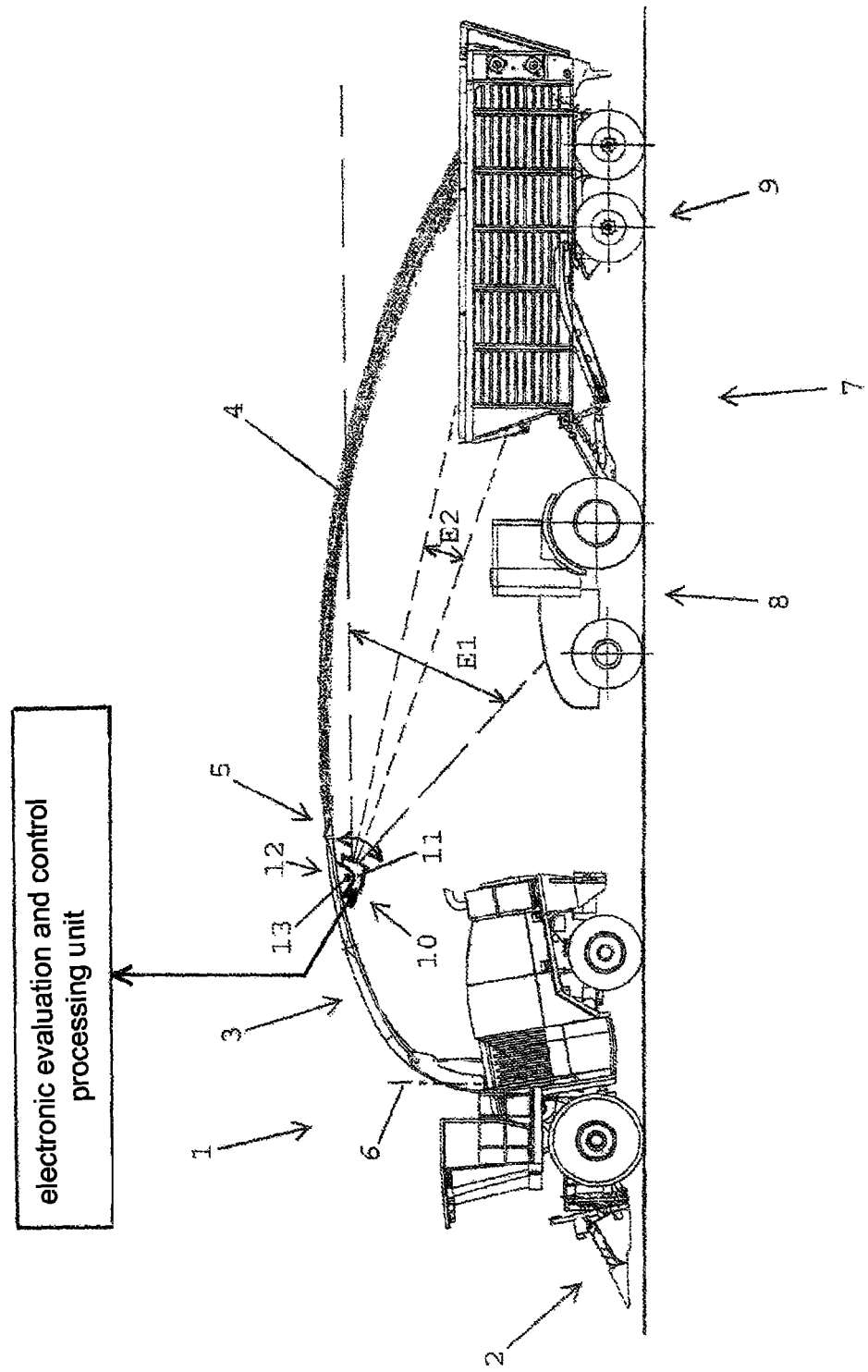

AGRICULTURAL HARVESTER

BACKGROUND OF THE INVENTION

The invention relates to an agricultural harvester, in particular a self-propelled forage harvester with pivotable discharge elbow for conveying the picked-up and processed crop into a loading container of a transport vehicle, wherein signals that are generated by an electro-optical device correlated with the discharge elbow are supplied to an electronic evaluation and control processing unit for automatic targeted guiding of the crop stream into the loading container.

Harvesting of agriculturally produced plants, which are used as forage or as biomass in comminuted chopped form, is performed preferably by means of a self-propelled forage harvester. By means of an appropriate harvesting attachment on the forage harvester, either the still standing plants are cut near the soil and fed to a pull-in device of the harvester or already mowed crop that has been collected in swathes is picked up from the ground of the field and also fed to the pull-in device of the harvester. Upon further passage through the forage harvester, the crop is comminuted and with the assistance of an acceleration device is further conveyed through a discharge elbow at a high speed such that it exits from the discharge elbow in a bundled crop stream and, even at greater distances, is still deposited without loss in a container.

The discharge elbow is generally mounted on the harvester so as to be rotatable about a vertical axis and pivotable about a horizontal axis. In this way, it can be swivelled between a rest position, in which it is in a lowered position and aligned approximately parallel to the longitudinal axis of the harvester, and in an operating position in which it extends, with the discharge end lifted, in particular transversely to the travel direction of the harvester. By means of a swiveling head at the discharge end of the discharge elbow, it is also possible to influence additionally the angle at which the crop is discharged.

In practice, a transport vehicle traveling next to the harvester, for example, in the form of a truck or a tractor with transport trailer, can be relatively directly loaded with the crop. In situation like turning at the headland, but also particularly at the beginning of harvesting a field with a forage harvester when next to the forage harvester there is not yet a harvested area available for parallel travel of the transport vehicle next to the forage harvester so that the transport vehicle must travel preferably behind the forage harvester, manual control of the discharge elbow for transfer of the crop as loss-free as possible into the transport container is a particular challenge for the operator of the harvester. Extremely increased throughput performances of the modern forage harvesters demand full attention of the driver due to faster harvesting travel speed and shorter fill times of the transport container.

In order to minimize the stress level on the driver and to increase the harvesting performance by avoiding downtime and loss of crop, different systems for automated filling of the transport container have been proposed. Newest systems that have already reached series production readiness are based preferably on electro-optical devices wherein optical features of the transport container are detected by means of at least one camera and the orientation of the discharge elbow is controlled such that the stream of crop is directed properly into the transport container. Such a system is disclosed already in DE 44 26 059 A1.

In practice, optical camera systems however have limits due to frequently occurring external influences such as dust, rain or lack of illumination.

In particular in special situations such as maneuvering a curve and at the beginning of harvesting a field with a forage harvester, these disadvantages are especially noticeable due to the enlarged distance between the harvesting vehicle and the transport container. In such cases, the operator must then manually intervene wherein crop losses are unavoidable at least at the time of transfer to manual control.

In further known systems, it is disadvantageous that an identification element is required on the transport containers for their recognition. In these devices, the transfer control is disadvantageously designed only for a special combination of a harvester and specifically furnished transport containers.

Accordingly, it is an object of the invention to provide a harvester with a pivotable discharge elbow that enables automatic and loss-free filling and filling as complete as possible of different unspecific transport containers in any harvesting situation.

SUMMARY OF THE INVENTION

In accordance with the present invention, this is achieved in that the agricultural harvester of the aforementioned kind comprises, in accordance with the present invention, an electro-optical device embodied as a 3D laser scanner comprised of a 2D laser scanner and a pivot unit by means of which the 2D laser scanner is pivotable about an axis that is at least approximately horizontal. The dependent claims further develop the solution according to the invention in an advantageous manner.

By furnishing the harvester according to the invention with a 3D laser scanner as an electro-optical device for automatic control of the discharge elbow movements during the transfer process of crop onto a transport vehicle, it is possible for the first time to avoid the aforementioned disadvantages of known crop transfer control devices and to perform in this way a loss-free automatic crop transfer, in particular even in especially difficult harvesting situations such as in particular at the beginning of harvesting a field with a forage harvester.

A laser scanner is to be understood as a device with at least one laser and one sensor by means of which a detection area can be sensed cyclically with one or several laser light beams, wherein, based on the reflected light of the laser beam that is received by the sensor, a position of object areas can be detected on which the laser beam has been reflected. Laser scanners are characterized by a very high precision and speed in regard to position determination.

The afore described simple 2D laser scanner however provides only a two-dimensional image of the sensed area which is however not satisfactory in all situations for the control of the discharge elbow. Since the scanner is advantageously mounted on the discharge elbow below the upper part of the discharge elbow, the laser curtain of the 2D laser scanner, in case of varying height adjustments of the discharge elbow, not always impinges at the same level on the transport vehicle or the transport container so that the recognition of such a three-dimensional object is at least made more difficult.

For this reason, the harvester according to the invention comprises a 3D laser scanner. The 3D laser scanner is based on a 2D laser scanner combined with a pivoting unit which, driven by a high-precision servo drive, pivots or swivels the 2D laser scanner up and down about a pivot axis that is positioned transverse to the longitudinal extension of the discharge elbow. Accordingly, a large detection area of the laser scanner is provided. The exact angular position of the pivot axis is linked with the measured distance data of the 2D laser scanner. In this way, a precise 3D image of the environment with possibly present objects to be measured is achieved.

Based on the data of the 3D laser scanner that are supplied to an electronic evaluation and control processing unit, detected objects are identified as transport containers by means of computation methods and appropriate commands for control of the movement actuators of the discharge elbow are generated for a fast and safe following action of the discharge elbow for following the container.

In this context, the evaluation and control processing unit of the harvester according to the invention in a particularly advantageous embodiment is characterized by the following procedure, based on a harvesting situation at the beginning of harvesting a field with a forage harvester with the transport vehicle following behind.

In a first operating phase, an initialization scan is performed. This scan searches for a transport vehicle within the entire detection area of the laser scanner. When a transport vehicle is recognized, the dimensions of the transport container are saved or stored in a memory. When several transport containers are found, the container with the shortest distance to the scanner is selected.

In a second operating phase, the pivoting and detection range of the scanner is subsequently limited or reduced. The pivoting range is adjusted such that only the forward container wall of the transport container is detected. The pivot duration is therefore significantly reduced so that the scanning rate is increased and thus the resolution of sequential scans and thus the following action are significantly improved. The pivot range must be dynamically adjusted as a function of distance and orientation of the vehicle relative to the scanner. This is realized based on contour features of the front side of the vehicle. When in this context a certain object position angle is surpassed, the reference point of the following action changes from the forward container wall to the respective facing long wall of the transport container.

Moreover, the evaluation and control processing unit is also capable of evaluating individual line scans (2D). In order to be able to determine the relative position, in addition to the so-called point cloud of a complete scan (3D), the data of individual line scans are utilized also. The latter are updated temporally much more frequently so that the new relative angle can be computed more frequently and faster because the data volume to be evaluated is much reduced. Based on the transport container dimensions saved or stored in memory, from the position of the forward container wall it is possible to deduce the correlated container.

A particularly advantageous further embodiment of the invention provides that the filling level of the transport container can be detected by evaluation of the detected data upon performing several complete scans under certain conditions. In this context it is then conceivable that the driver either presets the target point of the crop stream in the transport container or an automatic readjustment in accordance with the filling level and its distribution in the container is realized.

Accordingly, with the features of the present invention an agricultural harvester, in particular a self-propelled forage harvester with pivotable discharge elbow of the aforementioned kind for conveying the picked-up and processed crop into a loading container of a transport vehicle and controlled by an electronic evaluation and control processing unit in combination with an electro-optical device for automatic targeted guiding of the crop stream into the loading container, is provided for the first time which, in any harvesting situation, in particular even when the transport vehicle for receiving the crop cannot travel parallel to the harvester, enables a completely automatic loss-free loading of the transport vehicle. The driver of the harvester is thus extremely relieved of tasks other than driving and can therefore keep looking in the travel direction and concentrate solely on the driving action.

In the following, an embodiment of the invention will be explained in more detail with the aid of the drawing.

BRIEF DESCRIPTION OF THE DRAWING

The only drawing shows in a side view the harvester according to the invention in an embodiment of a self-propelled forage harvester with a correlated transport vehicle.

DESCRIPTION OF THE PREFERRED EMBODIMENTS

The forage harvester 1 illustrated in the drawing is furnished with a harvesting attachment 2 for picking up crop. The picked-up crop stream passes through at least one chopping device, not illustrated, within the harvester 1 and is accelerated by an acceleration device in such a way that it will pass at a high speed through the discharge elbow 3 and, at its end, is discharged therefrom still at a high speed. The discharge direction/trajectory of the crop 4 is influenced by an adjustable swivelling head 5. Also, the discharge elbow 3 is pivotable about an axis of rotation 6 that is at least approximately vertical and is also adjustable at the discharge end with regard to the height. The transport vehicle 7 which in the illustration follows the forage harvester 1 is a combination of a tractor 8 with pulled transport trailer, in the following referred to as transport container 9. The illustration as a whole shows the harvesting situation at the beginning of harvesting a field with a forage harvester when adjacent to the forage harvester 1 there is not yet space for parallel movement of the transport vehicle 7; therefore, the transport vehicle 7 must follow behind the forage harvester 1.

The difficult crop transfer situation as a result of the large distance between the end of the discharge elbow and the transport container 9 can be seen well in the drawing. Due to the long trajectory of the crop 4, even a very small movement at the discharge elbow will have a great effect on the target point of the crop stream with in the transport container. The narrow contour of the transport container 7 in longitudinal direction makes loading even more difficult.

On the discharge elbow 3 of the forage harvester 1 the electro-optical device 10 for automated discharge elbow control is provided. This 3D laser scanner 10 is comprised of a 2D laser scanner 11 and a pivot unit 12; the 2D laser scanner 11 can be pivoted about the horizontally oriented pivot axis 13 of the pivot unit 12 and perform a swivel or pivot movement similar to a nodding movement (nutation). Upon utilizing the maximum pivot angle of the pivot unit 12, a maximum detection range E1 of the 3D scanner 10 is thus provided. After identification of the transport container 9, the detection range is dynamically limited or reduced by limiting the pivot angle to a reduced detection range E2 that is as small as possible; this is advantageous because of a faster scanning frequency and thus higher resolution.

In the drawing, in an exemplary fashion the difficult crop transfer situation at the beginning of harvesting a field with a forage harvester is illustrated. Of course, the features of the invention of the harvester 1 are also advantageous for other crop transfer situations, for example, in the usual situation of parallel travel of transport vehicle and harvester.

The specification incorporates by reference the entire disclosure of German priority document 10 2013 018 724.9 having a filing date of Nov. 8, 2013.

While specific embodiments of the invention have been shown and described in detail to illustrate the inventive principles, it will be understood that the invention may be embodied otherwise without departing from such principles.

What is claimed is:

1. An agricultural harvester comprising:
a pivotable discharge elbow configured to convey picked-up and processed crop into a transport container of a transport vehicle;
an electro-optical device correlated with the discharge elbow;
an electronic evaluation and control processing unit connected to the electro-optical device, wherein the electronic evaluation and control processing unit is configured to process signals received from the electro-optical device and effect an automatic targeted control of the crop stream into the transport container based on the processed signals;
the electro-optical device embodied as a 3D laser scanner comprised of a 2D laser scanner and a pivot unit configured to pivot the 2D laser scanner about an at least approximately horizontal axis;
wherein the 3D laser scanner in a first operating phase is configured to scan a maximum detection range for detecting objects;
wherein the 3D laser scanner is configured to reduce the maximum detection range during a second operating phase to a reduced detection range;
wherein the reduced detection range of the 3D laser scanner in the second operating phase is realized by limiting a pivot angle of the pivot unit.

2. The agricultural harvester according to claim 1, wherein the pivot angle of the pivot unit is dynamically adjusted as a function of a distance and an orientation of a detected transport container relative to the 3D laser scanner.

3. The agricultural harvester according to claim 2, wherein the pivot angle of the pivot unit is adjustable dynamically to scan only a front wall of the detected transport container that is closest to the 3D laser scanner and to reduce a pivot duration of the pivot unit.

4. The agricultural harvester according to claim 1, wherein the electronic evaluation and control processing unit is configured to evaluate data of individual line scans of the 3D laser scanner to determine a relative position of a transport container so that, due to a much reduced data volume of computations performed in the electronic evaluation and control processing unit compared to processing a point cloud of a complete 3D scan, the pivot angle of the pivot unit is adjustable much faster to a new relative pivot angle.

5. The agricultural harvester according to claim 1, wherein the 3D laser scanner is arranged on the discharge elbow and is pivoted together with the discharge elbow.

* * * * *